United States Patent

Merriman, Jr.

[11] Patent Number: 5,126,607
[45] Date of Patent: Jun. 30, 1992

[54] STEPPER MOTOR VIBRATION ISOLATOR

[75] Inventor: Richard A. Merriman, Jr., Dayton, Ohio

[73] Assignee: NCR Corporation, Dayton, Ohio

[21] Appl. No.: 673,437

[22] Filed: Mar. 22, 1991

[51] Int. Cl.$^5$ .......................... H02K 5/24; F16B 21/06
[52] U.S. Cl. ...................................... 310/51; 248/638;
248/675; 310/43; 310/91; 403/192; 403/197
[58] Field of Search ............. 74/421 A; 248/635, 638,
248/674, 675; 310/43, 51, 89, 91, 168; 403/192,
194, 195, 197, 199, 201, 245

[56] References Cited

U.S. PATENT DOCUMENTS

| | | | |
|---|---|---|---|
| 4,420,702 | 12/1983 | Mixner | 310/43 |
| 4,520,987 | 6/1985 | Eguchi et al. | 248/635 |
| 4,531,700 | 7/1985 | Robinson | 248/674 |
| 4,648,579 | 3/1987 | Wilson | 248/635 |
| 4,655,099 | 4/1987 | Hansen | 74/421 A |
| 4,800,306 | 1/1989 | Oberto | 310/51 |
| 4,964,609 | 10/1990 | Tomell | 248/638 |

FOREIGN PATENT DOCUMENTS

| | | | |
|---|---|---|---|
| 2700637 | 7/1978 | Fed. Rep. of Germany | 248/635 |
| 2189289 | 10/1987 | United Kingdom | 403/245 |

*Primary Examiner*—Steven L. Stephan
*Assistant Examiner*—D. L. Rebsch
*Attorney, Agent, or Firm*—Elmer Wargo

[57] ABSTRACT

An apparatus for isolating a stepper motor from an associated mounting frame, with the motor having a circular locating step on a mounting face. An insert is used to increase the height of the locating step, to enable an isolation member to be positioned on the locating step, and yet provide a second locating step to be used in locating and isolating the motor relative to the frame.

7 Claims, 4 Drawing Sheets

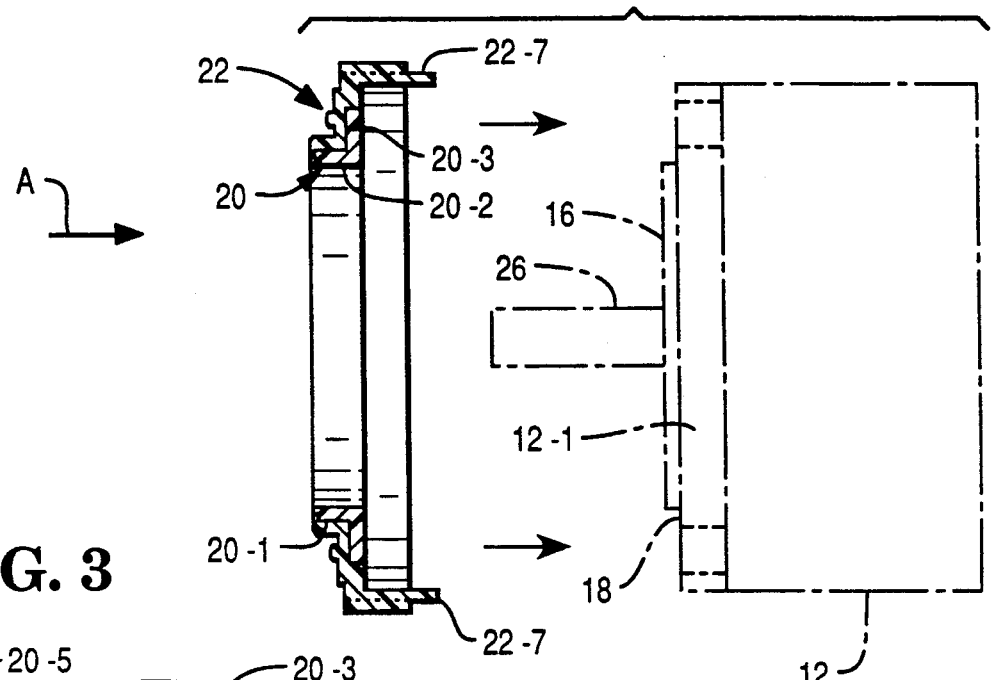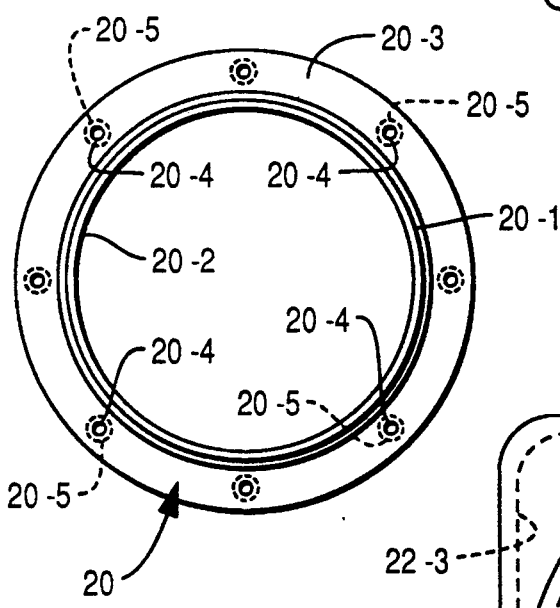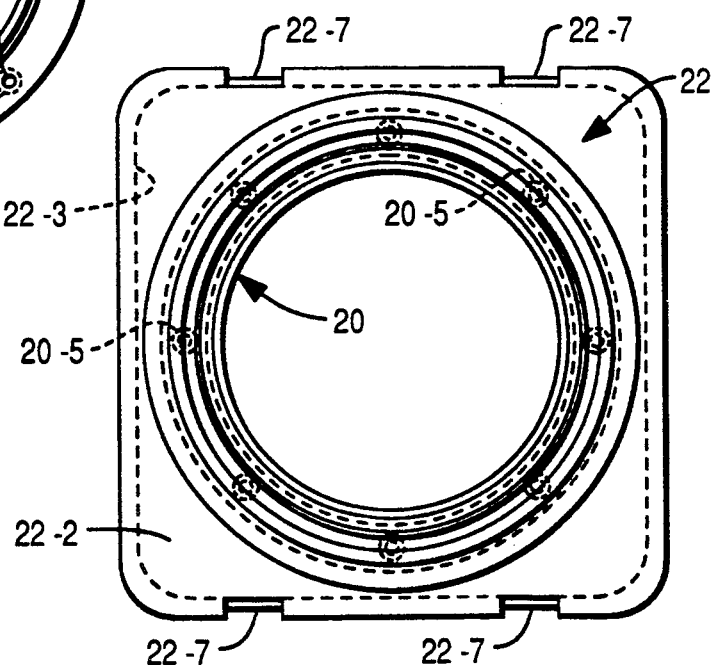

STEPPER MOTOR VIBRATION ISOLATOR

BACKGROUND OF THE INVENTION (1) Field of the Invention

This invention relates to an isolator for isolating stepper motor vibration from a frame in which the motor is mounted.

(2) Background Information

Stepper motors are used in association with printing and with paper forms handling where a high degree of positional accuracy is required. Stepper motors operate by rotating or "stepping" in very small increments while under the control of associated electronics. One of the problems with stepper motors is that they are generally noisy in operation.

Another problem with stepper motors is that they are designed to be located in a mounting frame by a very short circular step appearing on the face of each motor. This circular step is about 1 ½ inches in diameter, with the step being about 0.062 inch in height for one such stepper motor. When one attempts to put isolator material between the circular step on the mounting face and the mounting frame, there is little left of the circular step to provide the mounting function performed by the circular step relative to the mounting frame.

One prior art way of solving the problem mentioned in the previous paragraph, is to machine away a portion of the motor face to provide a step of increased height to accommodate the isolation member and still provide enough of a step to perform the locating functioned mentioned. This method results in a motor which is more expensive than a standard motor.

An object of this invention is to obviate the problem mentioned in the previous paragraph.

Another object is to provide an apparatus which provides vibration isolation for the stepper motor relative to the mounting frame, with the apparatus being a low cost one.

In a preferred embodiment of this invention, there is provided an apparatus comprising:

- a stepper motor having a mounting flange, a mounting face, and a circular locating step located on said mounting face, with said circular locating step having a first dimension;
- a first member mounted on said circular step and shaped to provide a first dimension greater than the first dimension of said circular locating step;
- a frame having a mounting hole therein;
- an isolation member mounted on said first member and shaped to isolate said first member and said mounting flange from said frame; and
- said frame having retaining means thereon retaining said mounting flange thereto with said isolation member positioned therebetween.

The above objects and advantages of this invention will be more readily understood in relation to the following description, claims and drawing.

BRIEF DESCRIPTION OF THE DRAWING

FIG. 2 is a cross-sectional view, in elevation, taken along the line 2—2 of FIG. 1.

FIG. 3 is front view of a circular insert used in the apparatus of FIG. 1, and the view is taken from the direction of arrow A shown in FIG. 2.

FIG. 4 is a view similar to FIG. 3, showing an isolation member mounted on the circular insert.

DESCRIPTION OF THE PREFERRED EMBODIMENT

Figure 1:
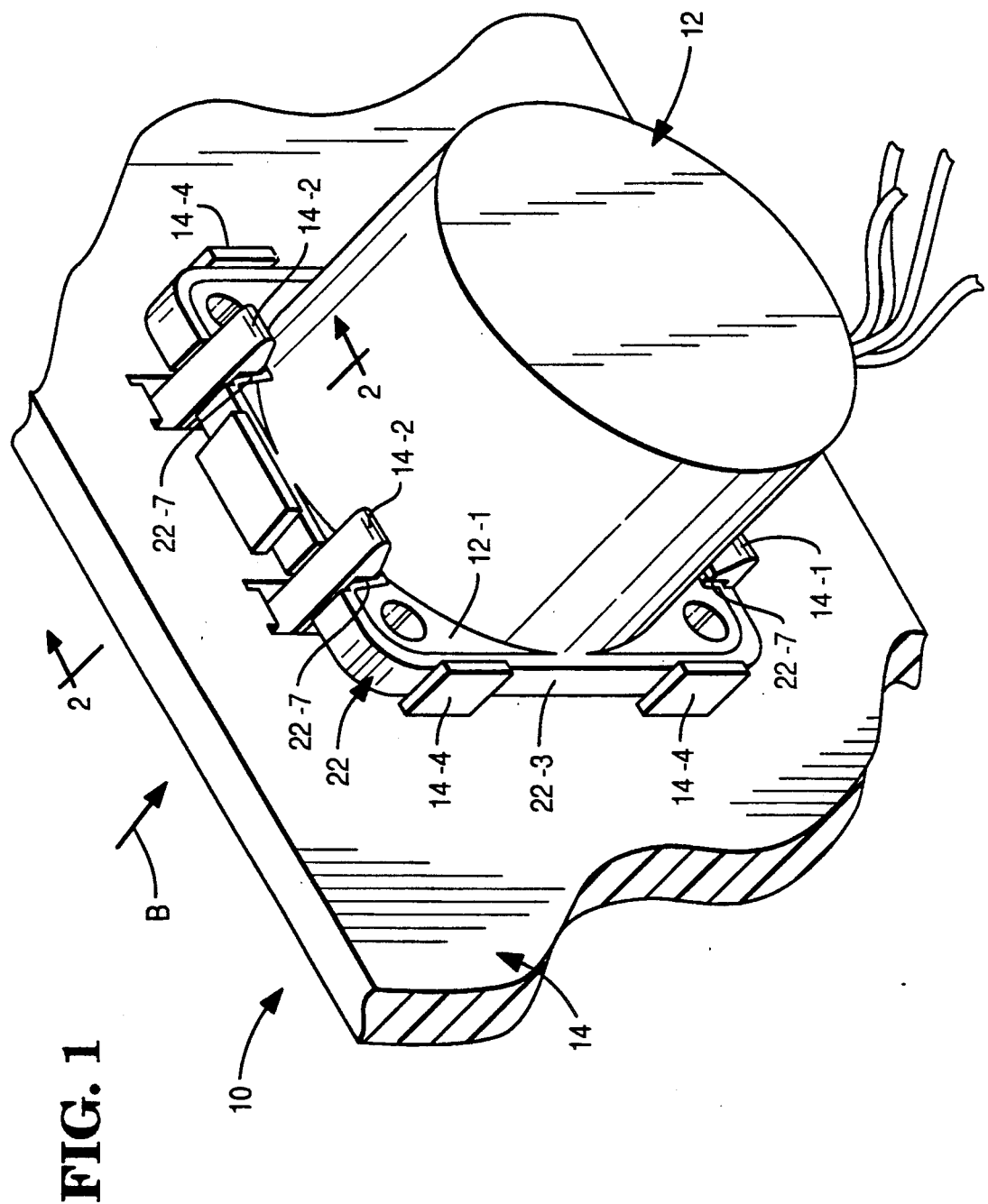
FIG. 1 is a general isometric view of a preferred embodiment of this invention, showing a stepping motor mounted on a frame.
Figure 5:
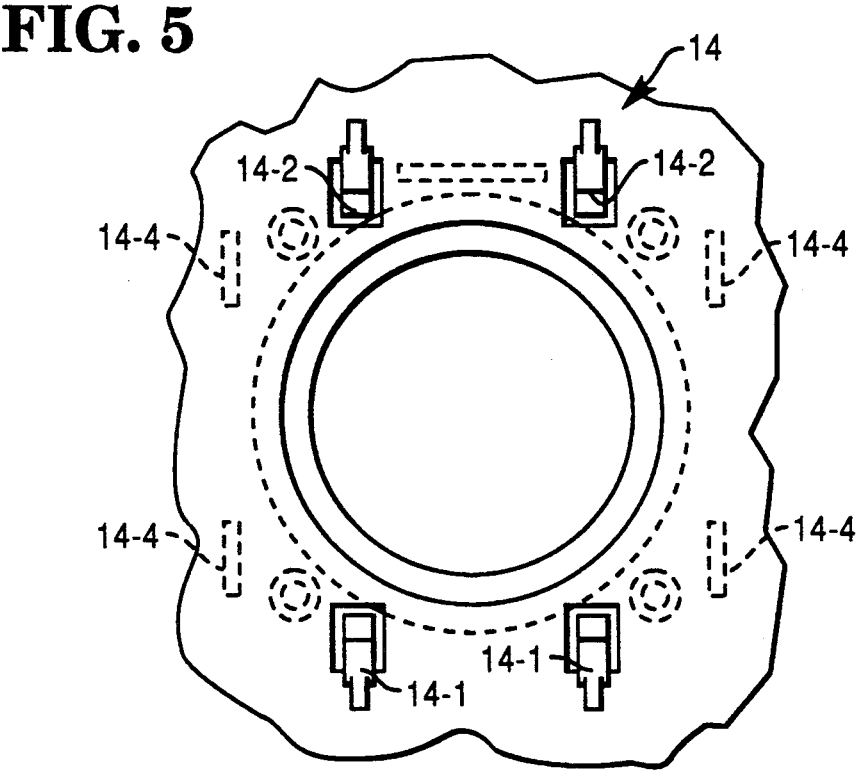
FIG. 5 is a front view, in elevation, and it is taken from the direction of arrow B in FIG. 1 to show additional details of the frame.

FIG. 1 is a general isometric view of a preferred embodiment of an apparatus 10 which incorporates the principles of this invention. The function of the apparatus 10 is to isolate a stepper motor 12 from a mounting frame 14 (from a vibration standpoint) while mounting the stepper motor 12 to the frame 14 to maintain the positional accuracy of the stepper motor 12.

As stated earlier herein, the stepper motor 12 has a circular step 16 which is part of a mounting face 18 as shown in FIG. 2. The circular step 16 has a first dimension or a height of 0.062 inch extending away from the mounting face 18; in a typical application, the circular step 16 is mounted in a receiving hole (not shown) in a frame. If a planar isolation member of 0.040 inch thickness is positioned over the circular step 16, there is only about 0.022 inch of the circular step 16 remaining to be mounted in the receiving hole of the frame. This does not leave enough of the circular step 16 to coact with the receiving hole to locate the stepper motor 12.

To solve this problem, the apparatus 10 of the present invention includes an insert 20 which is made of a plastic material like polycarbonate. The insert 20 is shaped to provide a circular locating step 20-1 for an isolation member 22 which is positioned between the insert 20 and the frame 14. The locating step 20-1 on the insert 20 has a dimension which is longer than the dimension or height of the circular step 16. The locating step 20-1 of the insert 20 has an internal diameter 20-2 (FIG. 8) which embraces the circular step 16 on the stepper motor 12, and it also has a mounting flange 20-3 which contacts the mounting face 18 on the stepper motor 12.

Figure 8:
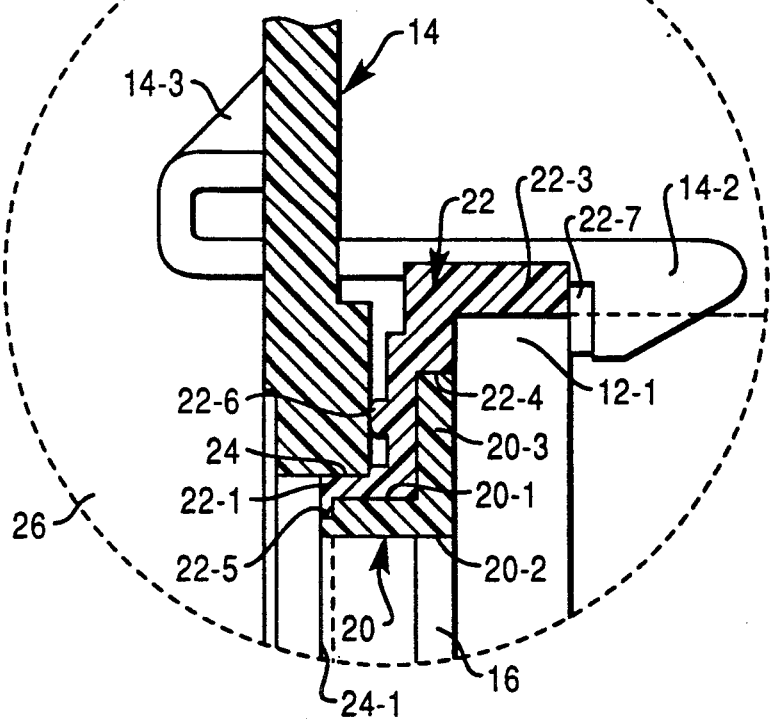
FIG. 8 is a view which is similar to FIG. 7; however, it shows, in enlarged scale, that portion shown in the circle C in FIG. 7.

As seen best in FIG. 8, the isolation member 22 is shaped to provide a locating step 22-1 (FIGS. 6 and 8) which is mounted in an opening 24 in the frame 14 as shown best in FIG. 8. The opening 24 has an annular shoulder 24-1 (FIG. 8) therein against which an annular lip 22-5 on the isolation member 22 abuts when the apparatus 10 is in the assembled relationship shown best in FIG. 8.

The isolation member 22 is made of a conventional isolation thermoplastic material and has a portion 22-2 which is quadrilaterally-shaped as shown in FIG. 4, with this portion 22-2 having a flange 22-3 which receives a mounting flange 12-1 of the stepper motor 12, as shown best in FIG. 1. The isolation member 22 isolates the vibrations of the stepper motor 12 from the frame 14. The cross section of the isolation member 22 is shown best in FIG. 8. The isolation member 22 has a recess 22-4 therein to receive the mounting flange 20-3 of the insert 20, as shown best in FIG. 8, and it also has the annular lip 22-5 which fits into a mating annular recess on the locating step 20-1 of the insert 20. The annular lip 22-5 abuts against the annular shoulder 24-1 in the opening 24 when the apparatus 10 is assembled as shown in FIG. 8. The isolation member 22 also has an annular rib 22-6 positioned between the isolation member 22 and the frame 14. There are also isolation tabs 22-7 extending from the isolation member 22 to isolate the flange 12-1 of the stepper motor 12 from lower grippers 14-1 and upper grippers 14-2 of the frame 14, as shown best in FIGS. 1 and 6-8.

The insert 20 has a plurality of pass-through holes 20-4 therein which communicate with associated annular recesses 20-5 as shown best in FIG. 3. After the insert 20 is made, it is positioned in a mold in which the isolation member 22 is to be made. In the ensuing molding process, the plastic material used in making the isolation member 22 passes through the pass-through holes 20-4 and flows into the associated recesses 20-5 to secure the isolation member 22 to the insert 20.

Figure 6:
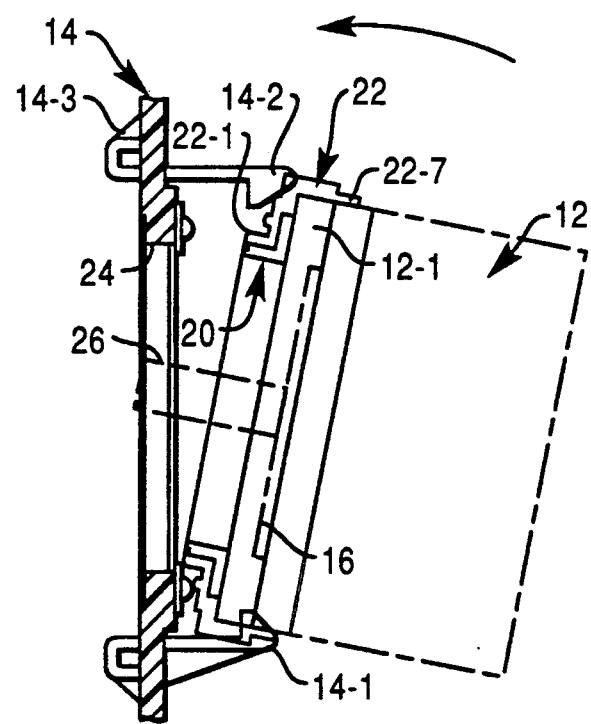
FIG. 6 is a view which is similar to FIG. 2; however, it is used to show how the stepper motor with the insert and isolation member mounted thereon is assembled or mounted on the frame.
Figure 7:
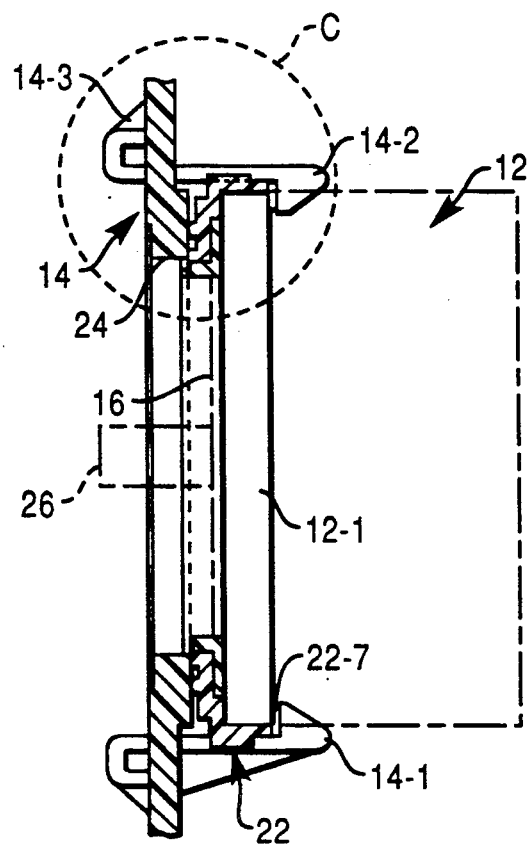
FIG. 7 is a view which is similar to FIG. 2, and it is used to show the motor being mounted on the frame.

To assemble the apparatus 10, the combined insert 20 and isolation member 22 are positioned on the stepper motor 12 so that insert 20 is located on the circular step 16 on the motor. The flange 12-1 of the stepper motor 12 is also positioned inside the portion 22-2 of the isolation member 22. Thereafter, the combination just described is positioned as shown in FIG. 6 so that the lower grippers 14-1 are positioned around the flange 12-1 with the tabs 22-7 on the isolation member 22 positioned therebetween. The upper grippers 14-2 are pushed upwardly (as viewed in FIG. 6) at the same time that the locating step 22-1 of the isolation member is inserted in the opening 24 to abut against the shoulder 24-1 therein. Thereafter, the upper grippers 14-2 are pushed downwardly to enable these grippers to be positioned around the flange 12-1 with the associated tabs 22-7 positioned therebetween to provide the assembled apparatus 12 shown in FIGS. 7 and 8.

The lower grippers 14-1 (FIGS. 5-8) alluded to are fixed to the frame 14 and are fairly rigid, whereas the upper grippers 14-2 are of cantilever construction and are anchored to the frame 14 by an anchor portion 14-3 shown best in FIG. 8. The upper grippers 14-2 are biased downwardly (as viewed in FIG. 6) to enable them to assume the position shown in FIG. 8. The frame 14 also has locators 14-4 extending therefrom as shown best in FIG. 1 to help retain the isolated stepper motor 12 on the frame 14. There is a close fit between the isolation member 22 and the locators 14-4; however, the locating step 22-1 on the isolation member 22 is relied upon for positioning the stepper motor 12 relative to the frame 14. The stepper motor 12 has an output shaft 26 which is coupled to apparatus (not shown) and not important to an understanding of this invention.

What is claimed is:

1. An apparatus comprising:
a stepper motor having a mounting flange, a mounting face, and a circular locating step located on said mounting face, with said circular locating step having a first dimension;
a first member mounted on said circular step and shaped to provide a second dimension greater than the first dimension of said circular locating step;
a frame having a mounting hole therein;
an isolation member mounted on said first member and shaped to isolate said first member and said mounting flange from said frame; and
said frame having retaining means thereon retaining said mounting flange thereto with said isolation member positioned therebetween.

2. The apparatus as claimed in claim 1 in which said first member is made of polycarbonate and said isolation member is made of an isolation thermoplastic material.

3. An apparatus comprising;
a stepper motor having a mounting flange, a mounting face, and a circular locating step located on said mounting face;
an insert mounted on said circular locating step, with said insert being shaped to provide a circular locating step; a frame having a mounting hole therein and also having an annular shoulder extending into said mounting hole; and
an isolation member being mounted on the circular locating step of said insert, with said isolation member being shaped to provide a circular locating step, with said circular locating step of said isolation member being mounted in said mounting hole and abutting against said annular shoulder;
said isolation member also having a portion corresponding in shape to said mounting flange; and
said frame having a retaining means thereon retaining said mounting flange thereto with said portion of said isolation member positioned therebetween.

4. The apparatus as claimed in claim 3 further including means securing said isolation member to said insert.

5. An apparatus comprising:
a stepper motor having a mounting flange, a mounting face, and a circular locating step located on said mounting face, with said circular locating step extending a first distance from said mounting face;
an insert having a tubular portion and a flange portion, with said tubular portion surrounding said locating step of said stepper motor and having a length extending beyond said first distance to a second distance from said mounting face, and with said flange portion contacting said mounting face;
a frame having a mounting hole therein and also having an annular shoulder extending into said mounting hole;
an isolation member having a tubular portion and a flange portion, with said tubular portion of said isolation member surrounding said tubular portion of said insert and extending along the length thereof;
securing means for securing said isolation member to said insert;
said isolation member having a portion corresponding in general shape to said mounting flange; and
said frame having retaining means for retaining said mounting flange thereto with said portion of said isolation member positioned therebetween.

6. The apparatus as claimed in claim 5 in which said insert is made of polycarbonate and said isolation member is made of an isolation thermoplastic material.

7. The apparatus as claimed in 6 in which said isolation member has tabs extending from said portion to isolate mounting flange from said retaining means.

* * * * *